Aug. 29, 1939.   T. F. PEARSON   2,171,096
APPARATUS FOR FEEDING MOLTEN GLASS
Filed Sept. 7, 1937   5 Sheets-Sheet 1

Aug. 29, 1939.   T. F. PEARSON   2,171,096
APPARATUS FOR FEEDING MOLTEN GLASS
Filed Sept. 7, 1937   5 Sheets-Sheet 3

Inventor:
Thomas F. Pearson,
Cushman Darby Cushman
Attorneys

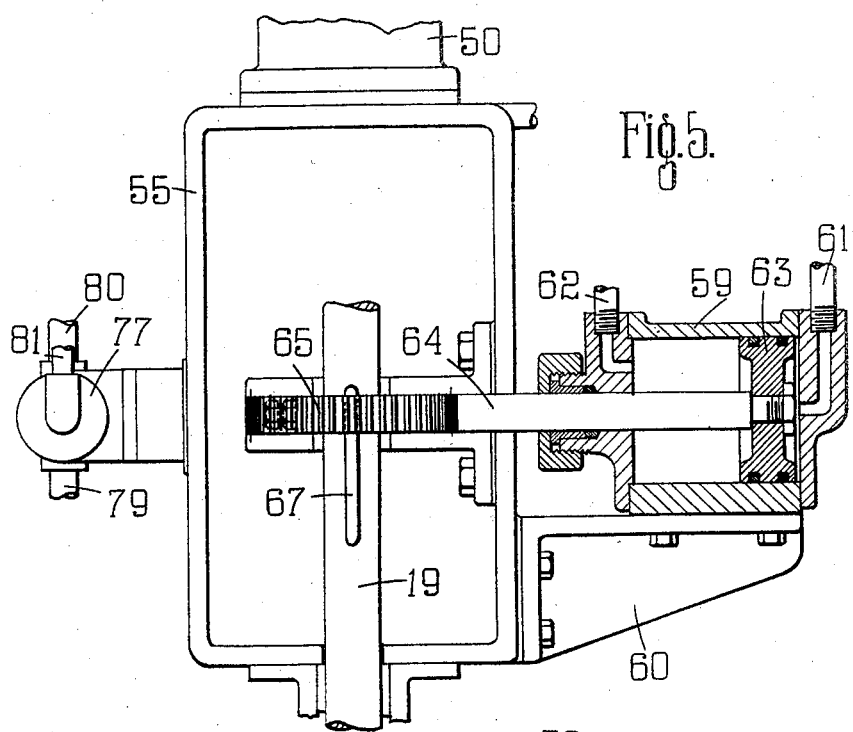
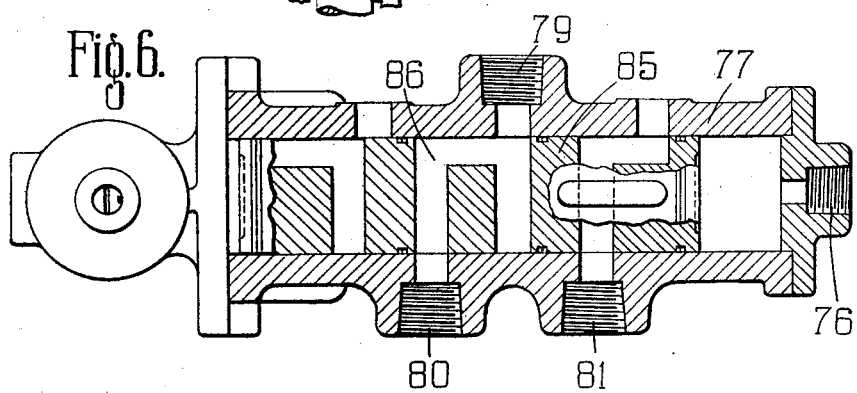
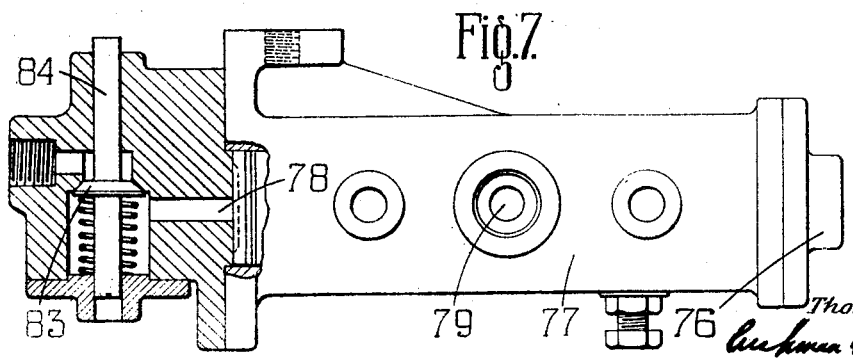

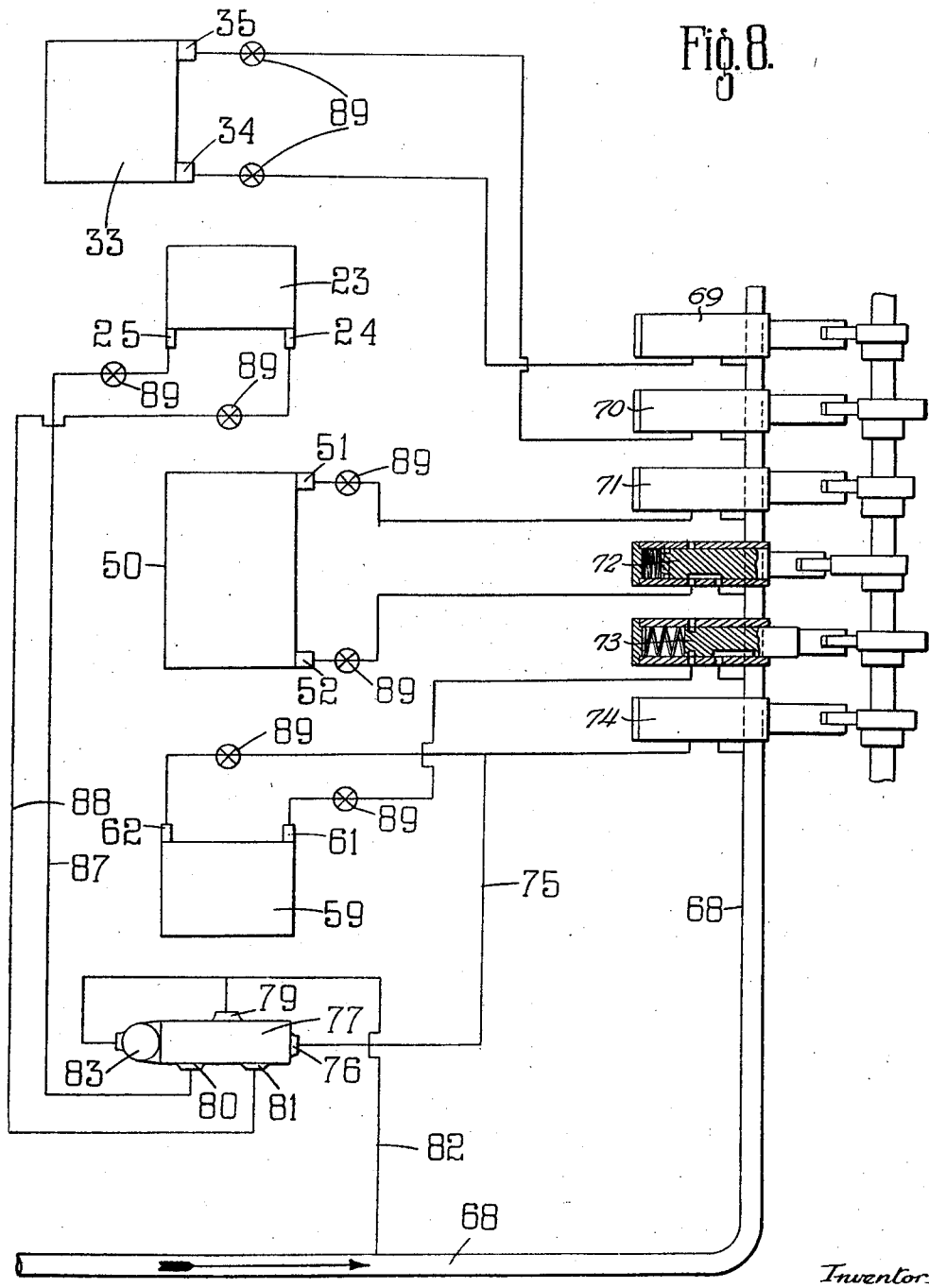

Patented Aug. 29, 1939

2,171,096

UNITED STATES PATENT OFFICE 2,171,096

APPARATUS FOR FEEDING MOLTEN GLASS

Thomas Finney Pearson, Pontefract, England, assignor to Crown Cork & Seal Company, Inc., New York, N. Y., a corporation of New York Application September 7, 1937, Serial No. 162,743
In Great Britain September 9, 1936

9 Claims. (Cl. 49—5)

The present invention relates to the feeding of charges of molten glass to parison moulds or the like receptacles, and in particular to the picking up of charges of molten glass from the fore-hearth of a furnace into a suction operated gathering head or mould and the displacement of said head to a position in which the charge may be dropped therefrom into a parison mould or other receptacle for further operations upon the glass charge, such as the blowing of a bottle or other hollow glass article.

According to the present invention a shaft from which a gathering head or mould radially extends is displaceable both longitudinally and angularly under the action of means which are pneumatically controlled whereby a simple yet efficient construction can be utilised for enabling a charge to be picked up from the fore-hearth, elevated with respect thereto, sheared from the main mass of glass, then withdrawn to one side of the fore-hearth and deposited into a parison or other mould for blowing operations, the gathering head then returning to its pick up position by a reversal of such movements.

The gathering head may be mounted upon an arm which carriers a suction valve and a mould opening and closing cylinder within which a pneumatically operated piston is displaceable, the arm in turn being mounted adjacent the upper end of a vertically disposed shaft which passes through a cylinder and is stepped to carry bearings for a piston surrounding the shaft, which piston is longitudinally displaceable within said cylinder.

The lower end of the shaft is splined to receive a gear wheel which is angularly rotated under the action of a rack which in turn is longitudinally displaceable by means of a piston reciprocating within a cylinder in accordance with the supply of compressed air governed by master control or timing mechanism. This latter cylinder, for the purpose of convenience, is referred to as the "swing cylinder", while the cylinder housing the piston carried on bearings about the shaft, for convenience is referred to as the "lift cylinder".

The rack at one end of its stroke is adapted to trip a valve which in turn blows a spool valve and enables air to be supplied therethrough to one end of the mould operating cylinder. This rack is adjustable while the shaft supporting mechanism is also adjustable on the supporting frame which may be the front of the fore-hearth so as to enable the unit to be raised or lowered to suit varying lengths of gathering moulds.

Similarly the shears for severing the glass picked up by the gathering head are actuated under the control of a pneumatically operated piston reciprocable within a cylinder supported on the frame which carries the "swing" and "lift" cylinders and the mould opening and closing cylinder, the operation of the separate pistons within their cylinders being effected pneumatically and in a predetermined sequence by a master control.

The invention is more particularly described with reference to the accompanying drawings, in which—

Figure 5 is an elevational view partly in section of the "swing" cylinder.

Figure 6 is a view of a combined spool and trip valve for controlling the pneumatic operation of the mould opening and closing cylinder in relation to the operation of the "swing" cylinder, the spool valve being shown in section.

Figure 7 is a corresponding view at right angles to that of Figure 6 but showing the trip valve in section.

Figure 8 is a general arrangement showing the various operating cylinders and valves diagrammatically.

Figure 1:
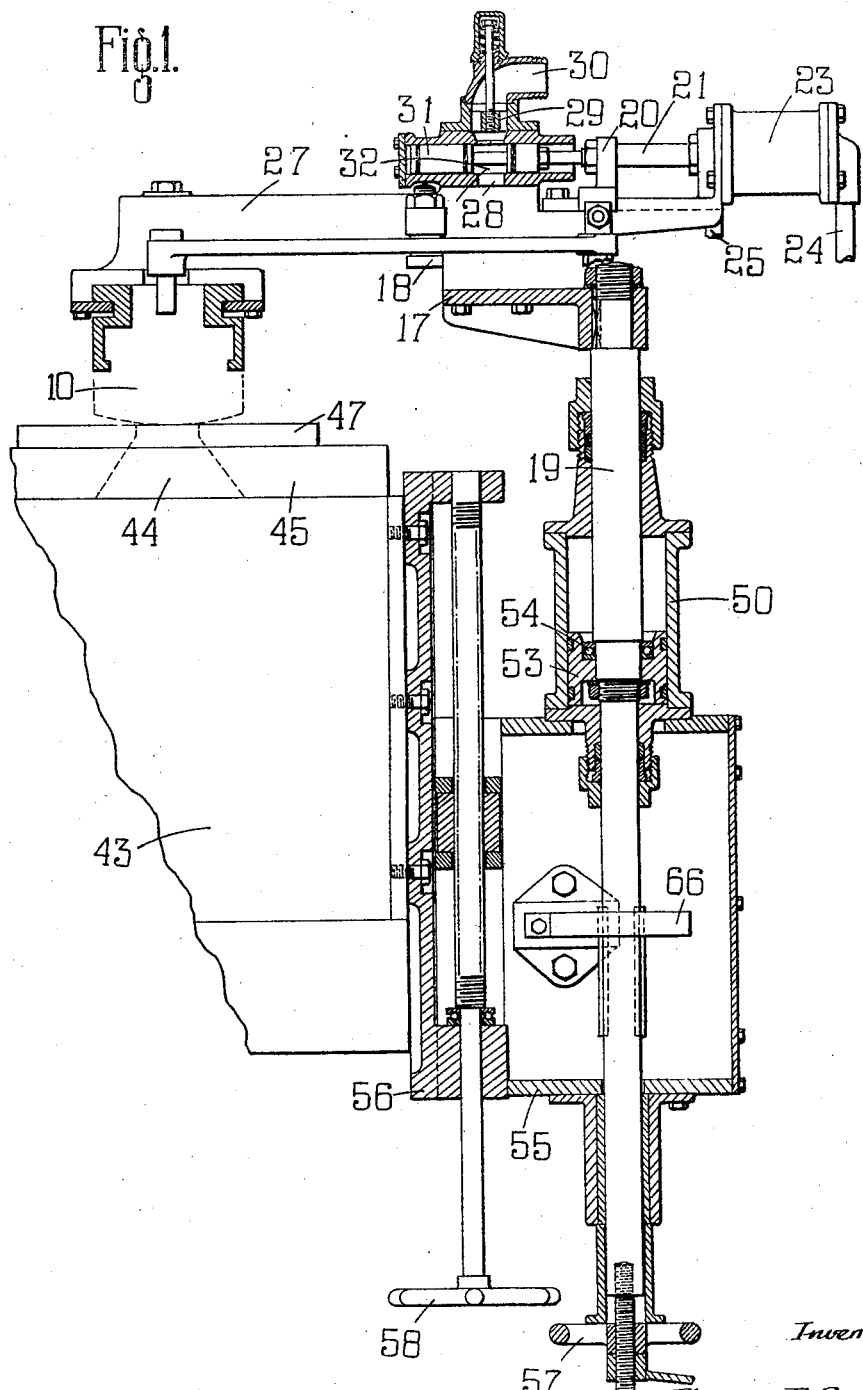
Figure 1 is a front elevation partly in section of a feeder constructed according to the present invention.

In the construction according to the drawings a gathering head 10 made up of relatively displaceable mould sections 11, 12, is shown in the suction position with the mould sections 11, 12, closed. The mould sections are displaceable by the action of pins 13, 14, carried by levers 15, 16, respectively said levers being pivoted at 18 to a bracket 17 carried at the upper end of a shaft 19.

The opposite ends of the levers 15, 16, are pivotally connected through links 26 to the opposite ends of a cross head 20 carried by a rod 21 of a piston reciprocable within a mould opening and closing cylinder 23 to the back of which pressure air is adapted to be fed through a pipe 24 to displace the piston to the left in Figures 1 and 8 and through a pipe 25 at the front end of the cylinder to displace the piston to the right in Figures 1 and 8.

It will be appreciated that when the piston is displaced to the left on pressure air being supplied through the pipe 24 the piston rod 21 is displaced to the left. This carries the cross head 20 with it and during said movement the cross head ultimately reaches a position in which it is in co-alignment with the links 26 to angularly displace the levers 15, 16, about their pivots and close the mould sections 11 and 12. When the cross head is moved in the reverse direction by applying pressure air through the port 25 the mould sections are opened.

Suction is applied to the gathering head 10 through a hollow arm 27 which is in communication through ports 28, 29, with a suction conduit 30, a valve 31 having an annular opening 32 intermediate its ends being longitudinally displaceable across the ports 28, 29 to open and close these at the required times.

This valve 31 is also displaceable with the piston rod 21, the arrangement being such that the valve 31 reaches that position in which it opens the ports 28, 29 only when the sections 11, 12, of the gathering head 10 are in their closed position.

Disposed horizontally but at right angles to the mould opening and closing cylinder 23 is the shear cylinder 33, said cylinder having ports 34, 35, respectively at its back and front ends for the supply of pressure air adapted to control the displacement of the piston 36, the rod 37 of which carries a cross head 38 which in its longitudinal displacement with the rod is adapted to angularly displace a pair of shears 39, 40 in opposite directions about a pivot 41. The shear cylinder is adjustably supported on a bracket 42 carried by the fore-hearth 43 of the furnace from which charges are to be drawn by the gathering head through an orifice 44 in the roof of the fore-hearth formed by a top refractory cover 45 and a replaceable refractory bushing 46 which is carried in a metal holder 47 supported by the refractory cover 45.

The vertical adjustment of the cylinder 33 and thus the vertical adjustment of the shears 39, 40, relative to the bushing 46 is under the control of a manually operated spindle 48 and handle 49.

In order to effect a cutting operation on a withdrawn charge by the shears, pressure air is supplied to the port 34 whilst to open the shears and thus displace the piston 36 in the opposite direction, pressure air is supplied through the port 35.

The shaft 19 carrying the bracket which pivotally supports the mould sections 11, 12, of the gathering head 10 passes through a "lift" cylinder 50 which is provided with ports 51, 52, at the top and base respectively (shown only in the general arrangement view in Figure 8). A piston 53 of the floating type is mounted for relative rotation about the shaft 19 through a thrust race 54, but on its reciprocation within the cylinder 50 carries said shaft with it. This shaft is raised by supplying pressure air to the port 52 at the base of the cylinder and is lowered by supplying pressure air through the port 51 at the top of the cylinder. The shaft also passes through a box 55 which is adjustably carried by a bracket 56 supported on the furnace fore-hearth 43. The length of the vertical stroke of the piston 53 and its shaft 19 is adjustable relatively to the box 55 by a hand wheel 57, while the height of the box 55 and the various parts carried thereby, including the shaft 19, may be adjusted relatively to the bracket 56 by a hand wheel 58. This latter adjustment permits of variation of height of the unit as a whole relative to the outlet 44 from the furnace to compensate for varying lengths of gathering heads which may be required in withdrawing charges of glass of varying sizes to suit particular requirements.

A "swing" cylinder 59 is mounted on a bracket 60 carried by the box 55, this "swing" cylinder having pipes 61, 62 located at its opposite ends for permitting pressure air to be supplied to the cylinder for displacing a piston 63 longitudinally therein, the piston carrying a rod 64, the opposite end of which is formed as a rack 65 which is adapted to engage with a toothed wheel 66 carried by the shaft 19. In order to permit vertical reciprocation of the shaft while maintaining the wheel 66 in the horizontal plane of the rod 64 and rack 65, the shaft 19 is splined at 67 and is engaged at said splined portion by the gear wheel 66.

It will thus be seen that on supplying pressure air through the port 61 of the "swing" cylinder 59 the piston 63 is displaced to the left in Figure 5 in order to rotate the shaft 19 and swing the gathering head 10 out of a position co-axial with the orifice 44 of the fore-hearth, while to bring the gathering head back into a position vertically above said orifice 44, pressure air is supplied to the port 62 of the "swing" cylinder 59 whereby the shaft 19 is rotated in the opposite direction. This swinging movement is effected solely when the shaft 19 is in its raised position, that is to say, the gathering head 10 has been elevated relatively to the orifice 44.

Pressure air is supplied through a pipe line 68 to a timing mechanism or master control which consists of a number of cam operated spool valves 69, 70, 71, 72, 73 and 74, diagrammatically illustrated in Figure 8.

The separate cams for operating the spool valves 69 ... 74 are shown diagrammatically in Figure 8 and are rotated from a common source of power supply through a common shaft or the like, and are arranged to actuate their respective spool valves in a sequence hereinafter explained.

The spool valve 74 when actuated allows of the passage of pressure air both to the port 62 of the "swing" cylinder 59 and through a branch conduit 75 to a port 76 of a spool valve housing 77 carried by the box 55 which has additional ports 78, 79, 80 and 81. (Figures 6 and 7). The ports 78, 79 are in communication with a conduit 82 which in turn constitutes a branch line from the main pressure air supply pipe 68, the port 78 being controlled by a trip valve 83, the spindle 84 of which lies in the path of longitudinal displacement of the rack 65 of the "swing" cylinder.

The spool valve 69 on operation by its cam, allows of the passage of pressure air from the main air supply pipe 68 to the port 35 of the cylinder 33 in order to close the shears while the spool valve 70 similarly operates to open the shears.

The spool valve 71 is operated by its cam to allow of pressure air supply to the port 51 at the top of the "lift" cylinder 50 in order to cause the gathering head to descend to pick up a glass charge through the orifice 44 of the fore-hearth 43.

The valve 72 when opened allows of the passage of pressure air to the opposite end or base of the "lift" cylinder 50 through the port 52 after a charge has been picked up by suction by the gathering head in order to lift said gathering head prior to being swung away from the vertical axis of the orifice 44.

The spool valve 73 is opened in order to swing the gathering head outwardly away from the vertical axis of the orifice 44 and for this purpose, when opened, the spool valve permits of pressure air supply from the pipe 68 to the rear of the "swing" cylinder 59 through the port 61.

When the spool valve 74 is opened pressure air is fed from the pipe 68 to the front of the "swing" cylinder 59 through the port 62 in order to swing the gathering head inwardly towards the vertical axis of the orifice 44.

While the spool valves 69 . . . 73 are being operated, pressure air is also being fed from the pipe 68 through the conduit 82 to the inlet port 79 of the spool valve cylinder 77 and during this period the spool valve 85 within the cylinder 77 is in the position shown in Figure 6, that is to say it is in such a position that pressure air passed into the cylinder 77 through the port 79 is allowed free access through a conduit 86 in the valve 85 to an exhaust port 80 of the cylinder where it traverses a pipe 87 and enters the mould opening and closing cylinder 23 at the front thereof, i. e., through port 25 thereby maintaining the mould sections of the gathering head in their open position.

When, however, the spool 74 is opened, not only is pressure air supplied to the front of the "swing" cylinder 59 through the port 62, but in addition, pressure air from the right hand end of the valve 85 (Fig. 6) is allowed to exhaust through the conduit 75 and through the exhaust port in the spool valve 74, this occurring when the rack 65 operates the trip valve 83 to permit of the application of pressure air through said valve 83 to force the spool valve 85 (Fig. 6) to the right. As soon as the spool valve is forced to the right of Figure 6 the inlet port 79 through the ducts 86 is in communication with the exhaust port 81 thus allowing the application of pressure air through a conduit 88 to the rear end of the mould opening and closing cylinder 23 via the port 24 thereof. This action causes the mould sections of the gathering head to close.

Figure 2:
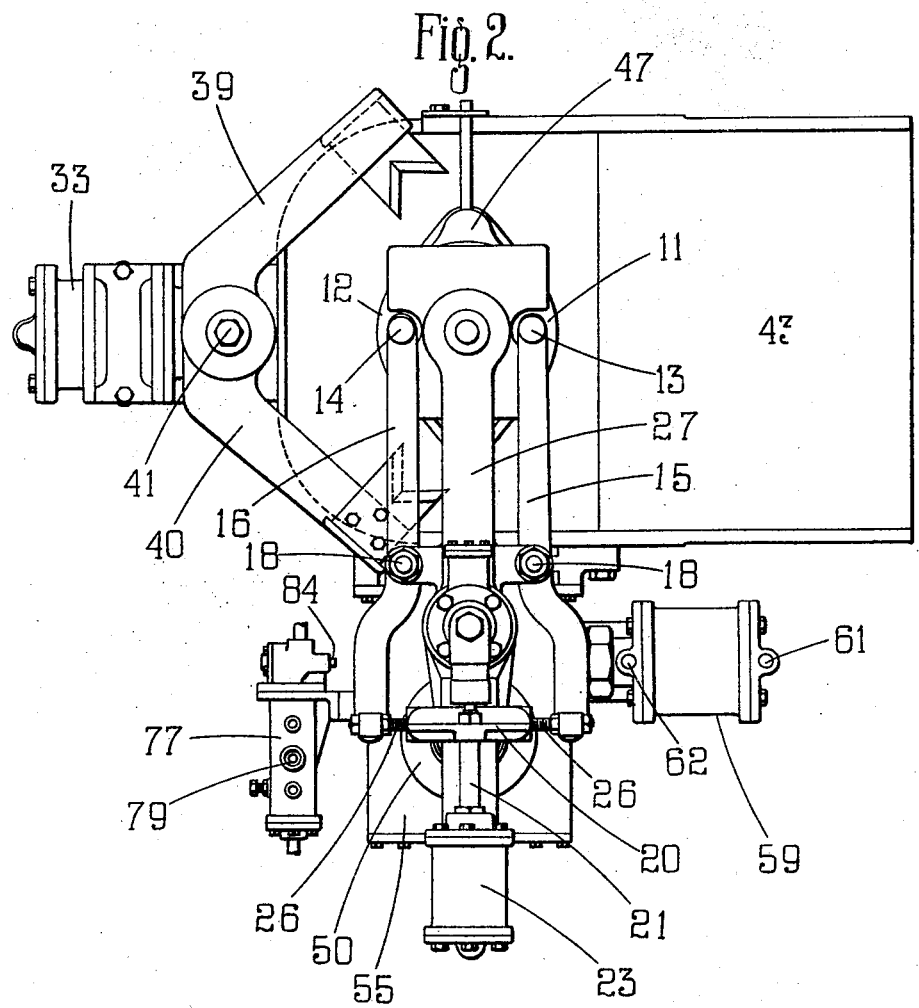
Figure 2 is a corresponding plan view.
Figure 3:
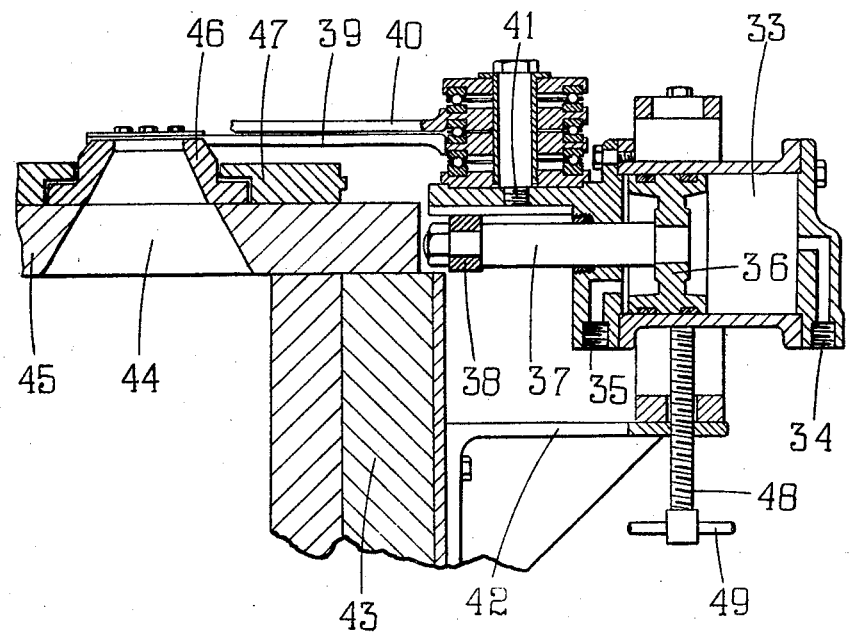
Figure 3 is a side elevation partly in section showing the shear cylinder.
Figure 4:
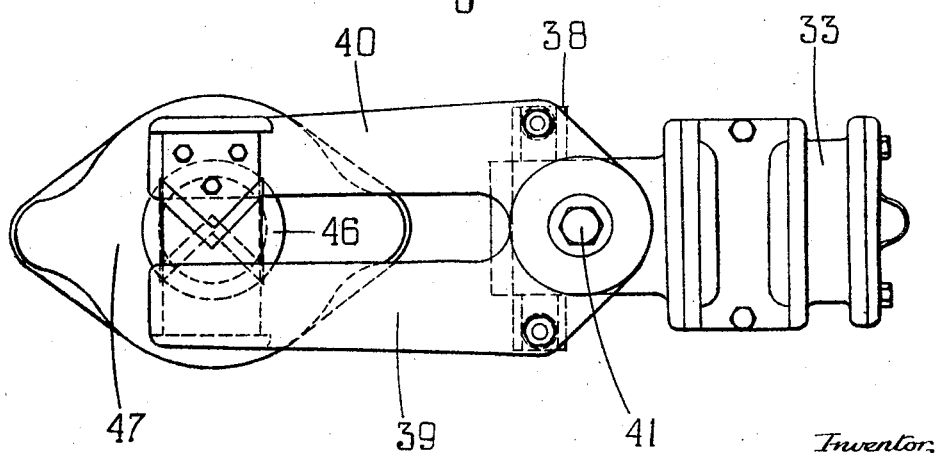
Figure 4 is a corresponding plan view to that of the Figure 3.

The cycle of operations is as follows:

With the parts shown in the positions indicated in Figures 1 and 2, the mould sections of the gathering head 10 are in their closed position, the suction ports 28 and 29 are open and the arm 27 and shaft 19 are in their lower position. Accordingly a charge of glass is picked up from the fore-hearth by suction through the orifice 44 and when this has been effected the shaft 19 and arm 27 are raised due to the operation of the spool valve 72 by its cam which permits of the supply of pressure air to the base of the "lift" cylinder 50.

On reaching the top of the vertical stroke of the shaft 19 pressure air is supplied from the main air pipe 68 through the spool valve 69 to the base of the shear cylinder 33 whereby the shears are closed to sever the charge in the gathering head. The spool valve 70 is substantially immediately operated to interconnect the conduit 68 with the top of the shear cylinder through the port 35 thereby causing the shears to open and when this operation has been performed the spool valve 73 is then opened by its cam to allow of the passage of pressure air to the back of the "swing" cylinder 59 through the port 61, thus causing the shaft 19 to rotate about its own vertical axis and the arm 27 with the gathering head thereby to swing outwardly away from the vertical axis of the orifice 44. While this is happening the mould sections remain closed. At the completion of the swinging movement, however, the rack 65 trips the valve 83 which in turn displaces the spool valve 85 to the right of Figure 6 and allows of passage of pressure air from the supply pipe 68 through a conduit 82, ports 79, 81, conduit 88 and port 24 to the back of the mould opening and closing cylinder 23, whereupon the mould sections 11, 12, are opened to allow the charge in the gathering head to be deposited to a parison or other mould of the forming machine.

The spool valve 74 is then operated to apply pressure air through the port 62 to the front of the "swing" cylinder 59 and thus cause the gathering head to swing back towards the vertical axis of the orifice 44 of the fore-hearth. Simultaneously pressure air is also fed through the spool valve 74, conduit 75 and port 76 into the right hand end of the spool valve cylinder 77 to cause the spool valve 85 to move to the left (Fig. 6) and thus establish connection between the inlet port 79 of the spool valve cylinder 77 and the exhaust port 80 thereof, whereupon pressure air is fed through the conduit 87 and the port 24 to the rear of the mould opening and closing cylinder 23. This effects closing of the mould sections.

The last operation in the cycle is effected by opening of the spool valve 71 of the timing mechanism whereby pressure air from the conduit 68 is fed through the port 51 into the top of the "lift" cylinder to cause the shaft 19 to descend to the position shown in Figure 1 whereupon the cycle of operations is repeated.

It will be appreciated that each spool valve 69 . . . 74 allows of the application of pressure air and of exhaust thereof when required, that is to say when not delivering pressure air to one end of a cylinder for the purpose of displacing the piston thereof in a direction towards the opposite end, each spool valve permits of exhaust of pressure air from said first mentioned end when the piston is displaced in the reverse direction, by the application of air under pressure to the opposite end.

Cushion valves 89 may be provided in the conduits between the valves 69 . . . 74 of the timing mechanism and the various cylinders, and also in the conduits 87, 88 between the cushion valve 85 and the mould opening and closing cylinder 23.

It will, of course, be appreciated that with the present invention charges of glass may be picked up from the fore-hearth 43 of the furnace either by permitting the gathering head 10 to descend into charging contact with the molten glass in the orifice 44, or alternatively by the method and with the apparatus described in the specification of my co-pending patent application No. 151,010.

I declare that what I claim is—

1. Apparatus for feeding molten glass from a furnace, comprising a suction operated gathering head including relatively displaceable mould sections, pneumatically operated shears for severing the charges picked up by said head, pneumatically operated means simultaneously controlling suction to and opening and closing of said mould sections, pneumatically operated means for vertically displacing said head, pneumatically operated means for swinging said head towards and away from its position at which it picks up charges by suction, and a master control for the actuation of said pneumatically operated means in predetermined sequence.

2. Apparatus for feeding molten glass from a furnace comprising a suction operated gathering head including relatively displaceable mould sections for picking up glass charges through an orifice in a furnace, shears for severing the glass picked up by the head from the mass of glass in the furnace, means for applying suction to said head, means for vertically displacing said head in a direction coaxially of said orifice, means for swinging said head towards and away from the axis of said orifice, pneumatically operated means for terminating the application of suction to said head and for simultaneously relatively displacing the mould sections to open the mould, and a control valve for the actuating air for the last-mentioned means, said valve being operated at a predetermined time by the means for swinging the head away from the axis of the orifice.

3. Apparatus for feeding molten glass from a furnace comprising a suction operated gathering head including relatively displaceable mould sections, pneumatically operated shears for severing the charges picked up by said head, pneumatically operated means simultaneously controlling suction to and opening and closing of said mould sections, an arm carrying said head, a shaft carrying said arm, pneumatically operated means for vertically displacing said shaft and for independently rotating said shaft irrespective of its vertical displacement, and a master control for the actuation of said pneumatically operated means in predetermined sequence.

4. Apparatus for feeding molten glass from a furnace comprising a suction operated gathering head including relatively displaceable mould sections, pneumatically operated shears for severing the charges picked up by said head, pneumatically operated means simultaneously controlling suction to and opening and closing of said mould sections, a radial arm carrying said head, a shaft carrying said radial arm, a pneumatically operated piston, rack and pinion for rotating said shaft about its own axis to swing said head, a pneumatically operated piston for displacing said shaft axially to lift and lower said head, a thrust race between said axially displacing piston and said shaft, and a master control for the actuation of said pneumatically operated means in predetermined sequence.

5. Apparatus for feeding molten glass from a furnace, comprising a suction operated gathering head including relatively displaceable mould sections, pneumatically operated shears for severing the charges picked up by said head, pneumatically operated means simultaneously controlling suction to and opening and closing of said mould sections, pneumatically operated means for vertically displacing said head, pneumatically operated means for swinging said head towards and away from its position at which it picks up charges by suction, a master timing control including a number of cam operated spool valves for the actuation of said pneumatically operated means in predetermined sequence, and separate control including a trip valve between said timing control and one of said pneumatic means, for opening and closing said mould sections at predetermined positions in the cycle of operations under the control of said master timer.

6. Apparatus for feeding molten glass from a furnace, comprising a suction operated gathering head including relatively displaceable mould sections, a hollow radial arm carrying said head, a splined vertical shaft carrying said radial arm, suction applying means, pneumatically operated means adapted both to cut off said arm from said suction applying means and simultaneously to open said sections, a pneumatically operated piston adapted to displace said shaft axially to lower and lift said head, a thrust race between said piston and said shaft, a second pneumatically operated piston, a rack, a pinion carried by the splined part of said shaft and adapted to rotate said shaft on operation of said second piston, without rotation of said first piston, to swing said arm and head about the axis of said shaft, a master control for the actuation of said pneumatically operated means in predetermined sequence, and a trip valve engaged by said rack for separately controlling said mould opening and closing means.

7. Apparatus for feeding molten glass from a forehearth, comprising a suction operated gathering head including relatively displaceable mould sections, means for raising and lowering said head, means for swinging the head laterally from a gathering position to a discharge position, means for relatively displacing said mould sections to open said mould and simultaneously to terminate the suction in the mould, and control means for said last-mentioned means operated by said means for swinging the head to said discharge position, at a predetermined point in the swinging movement of the head, whereby the mould sections are maintained closed and the charge is held therein by suction until said discharge position is reached, whereupon the sections are opened and the suction simultaneously terminated, to effect a discharge of the mould contents.

8. Apparatus for feeding molten glass from a fore-hearth, comprising a suction operated gathering head including relatively displaceable mould sections, means for raising and lowering said head, means for swinging the head laterally from a gathering position to a discharge position, a valve for controlling the suction in the mould, pneumatic means for opening and closing the mould sections, a connection between said pneumatic means and said valve, whereby the valve is closed simultaneously with opening of the mould sections, a control valve for the operating air leading to said pneumatic means, and means actuated by the means for swinging the head for operating said valve.

9. Apparatus for feeding molten glass from a fore-hearth, comprising a suction operated gathering head including relatively displaceable mould sections, pneumatic means for raising and lowering said head, pneumatic means for swinging the head laterally between a gathering position and a discharge position, pneumatic means for relatively displacing said mould sections to open and close said mould and for simultaneously terminating and establishing suction in the mould, a timer for controlling the flow of actuating air to the first-mentioned two means, and separate valve means for controlling the application of actuating air to the last-mentioned means, and means actuated by the means for swinging the head laterally for operating said separate valve means, simultaneously to open said mould and cut off the suction therein.

THOMAS FINNEY PEARSON.